(12) United States Patent
Suzuki et al.

(10) Patent No.: US 8,897,614 B2
(45) Date of Patent: Nov. 25, 2014

(54) ELECTRO-OPTICAL ELEMENT

(75) Inventors: Shuichi Suzuki, Yokohama (JP); Atsushi Sakai, Yokohama (JP); Koichiro Nakamura, Yokohama (JP); Jun Nakagawa, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/392,419

(22) PCT Filed: Aug. 25, 2010

(86) PCT No.: PCT/JP2010/064858
§ 371 (c)(1),
(2), (4) Date: Feb. 24, 2012

(87) PCT Pub. No.: WO2011/025051
PCT Pub. Date: Mar. 3, 2011

(65) Prior Publication Data
US 2012/0155824 A1    Jun. 21, 2012

(30) Foreign Application Priority Data
Aug. 26, 2009    (JP) ................. 2009-195426

(51) Int. Cl.
| | |
|---|---|
| *G02B 6/10* | (2006.01) |
| *G02F 1/035* | (2006.01) |
| *G02F 1/295* | (2006.01) |
| *G02B 6/12* | (2006.01) |
| *G02F 1/225* | (2006.01) |

(52) U.S. Cl.
CPC ............ *G02F 1/035* (2013.01); *G02F 1/295* (2013.01); *G02F 1/225* (2013.01)
USPC ...... 385/131; 385/2; 385/8; 385/14; 385/129; 385/130

(58) Field of Classification Search
CPC ......... G02F 1/035; G02F 1/025; G02F 1/225; G02F 1/2255; G02F 1/2257; G02B 6/122
USPC ................. 385/1–3, 8, 16, 129–132
See application file for complete search history.

(56) References Cited

U.S. PATENT DOCUMENTS

| | | | |
|---|---|---|---|
| 5,887,116 A * | 3/1999 | Grote | 385/2 |
| 2002/0085603 A1* | 7/2002 | Okumura | 372/45 |

(Continued)

FOREIGN PATENT DOCUMENTS

| | | |
|---|---|---|
| JP | 2004 219751 | 8/2004 |
| JP | 2009 80378 | 4/2009 |

(Continued)

OTHER PUBLICATIONS

Sasaura, M., "TSSG pulling and LPE growth of $KTa_xNb_{1-x}O_3$ for optical waveguides," Journal of Crystal Growth, vol. 275, pp. e2099-e2103, (Dec. 15, 2004).

(Continued)

*Primary Examiner* — Kaveh Kianni
*Assistant Examiner* — Hung Lam
(74) *Attorney, Agent, or Firm* — Oblon, Spivak, McClelland, Maier & Neustadt, L.L.P.

(57) ABSTRACT

An electro-optical element includes a core layer made of an electro-optical material, a clad structure disposed on each of opposite sides of the core layer and configured to form an optical waveguide together with the core layer, and a pair of electrode layers, one of which being disposed on one side of the clad structure and another being disposed on another side of the clad structure. The clad structure includes a first clad layer and a second clad layer. The second clad layer has a dielectric permittivity larger than that of the first clad layer, and the second clad layer has a thickness thicker than that of the first clad layer.

15 Claims, 3 Drawing Sheets

(56) References Cited

U.S. PATENT DOCUMENTS

| | | | |
|---|---|---|---|
| 2004/0096179 A1 | 5/2004 | Bintz et al. | |
| 2004/0202426 A1* | 10/2004 | Hill | 385/39 |
| 2005/0201439 A1* | 9/2005 | Horie | 372/43.01 |
| 2005/0238277 A1* | 10/2005 | Wang et al. | 385/8 |
| 2006/0109542 A1 | 5/2006 | Mizuuchi et al. | |
| 2010/0232736 A1* | 9/2010 | Ichikawa et al. | 385/2 |

FOREIGN PATENT DOCUMENTS

| | | |
|---|---|---|
| JP | 2009080378 A * | 4/2009 |
| JP | 2009 271435 | 11/2009 |

OTHER PUBLICATIONS

Fujiura, K., et al., "KTN Optical Waveguide Technologies with a Large Electro-Optic Effect," Pacific Rim Conference on Lasers and Electro-Optics, pp. 69-70, (Aug. 30, 2005).

Miyazu, J., "Control of Electron Injection into KTN Crystals by Electrode Materials," The Japan Society of Applied Physics and Related Sciences, No. 3, p. 1253 (Mar. 27, 2007).

International Search Report Issued Oct. 5, 2010 in PCT/JP10/64858 Filed Aug. 25, 2010.

Extended European Search Report issued Dec. 9, 2013 in Patent Application No. 10812095.7.

* cited by examiner

ELECTRO-OPTICAL ELEMENT

TECHNICAL FIELD

The present invention relates to an improvement in an electric optical element, more specifically to an optical waveguide type-electric optical element

BACKGROUND ART

There is conventionally known an electro-optical element as an optical element using an electro-optical effect. The electro-optical element is used for optical intensity modulators, Q-switch elements, light beam scanners or the like because the electro-optical element has a property that a response to change in electric field is very rapid.

The electro-optical effect means, in general, physical phenomenon that when electric field is applied to an object through which light passes, a refractive index thereof changes. In addition, an effect that a refractive index changes in proportion to intensity of an electric field is referred to as Pockels effect. An amount of change in a refractive index is given by the following equation (1).

$$\Delta n \propto r_{ij} \times V/d \qquad (1)$$

Where $r_{ij}$ is electro-optical constant (Pockels constant), V is an applied voltage, and d is a space between electrodes applying a voltage.

An amount of change in the refractive index caused by the electro-optical effect is relatively small, for example, if lithium niobate which is a typical electro-optical material is used, it is necessary to apply a large electric field of about 6 kV/mm to an electro-optical crystal (EO crystal) in order to give change in a refractive index of about $\Delta n=0.001$. Practically, it is requested that the electro-optical element can operate with a low voltage and has good response characteristic with a wide frequency band. It is effective that a space d between electrodes is set to be a small value as is clear from the equation (1) to acquire large change of refractive index with a low voltage.

On the other hand, as a typical example of forming an optical waveguide in an electro-optical material, there is known a technology of forming the optical waveguide by impurity diffusion, in which titan is locally diffused in an electro-optical material of lithium niobate or the like, and a refractive index of the titan-diffused area only is increased, thereby the optical waveguide is formed. In the optical waveguide structure, electrodes are provided adjacent to an optical waveguide area formed by the impurity diffusion on a surface of the electro-optical crystal.

As another example of forming the optical waveguide in the electro-optical material, there is known a technology of forming the optical waveguide, in which an electro-optical crystal is thinned by polishing or the like, and electrode layers are provided on an upper surface and a lower surface of a substrate as a core layer, formed by the thinned electro-optical crystal, thereby the optical waveguide is formed. In this case, a direction of applying an electric field is perpendicular to the upper surface and the lower surface of the substrate of the electro-optical crystal. In the technology of forming the optical waveguide in an electro-optical element, because it is possible to form the optical waveguide structure while maintaining a characteristic of the electro-optical effect which is innate characteristic of the electro-optical crystal, an electro-optical element effective to a low voltage operation can be provided.

In such a thin-film type-electro-optical element, it is necessary to provide as a clad layer a transparent material having a refractive index lower than that of the core layer between the thinned substrate and each electrode, in order to propagate waveguide light while confining the light in the electro-optical crystal substrate of a thinned film as the core layer of the waveguide. As a typical clad material forming the clad layer, a dielectric material such as $SiO_2$ is used.

If a voltage is applied to the optical waveguide formed by the core layer and the clad layers, the voltage applied to the core layer is obtained by the following equation (2).

$$V_{co}=V/[1+(d_{cl}/d_{co}\cdot\in_{co}/\in_{cl})] \qquad (2)$$

Where V is a voltage applied to the optical waveguide, $V_{co}$ is a voltage applied to the core layer, $d_{co}$ is a thickness of the core layer, $d_{cl}$ is a thickness of each of the clad layers, $\in_{co}$ is a dielectric permittivity of the core layer, and $E_{cl}$ is a dielectric permittivity of each of the clad layers.

As is clear from the equation (2), when the clad layers are provided, because denominator of right-hand side of the equation (2) is larger than 1, a voltage applied to the electro-optical crystal substrate itself, that is to say, a voltage $V_{co}$ applied to the core layer becomes a low value.

For example, in an optical waveguide type-electro-optical element in which a core layer is formed by a thin film made of lithium niobate, and each of clad layers is made of $SiO_2$, if the core layer has 10 micrometers in thickness, and each of the clad layers has 1 micrometer in thickness, a voltage applied to an electro-optical crystal itself (lithium niobate of the electro-optical material) is only about 0.4 times as much as a voltage applied to the entire electro-optical element, and therefore the electro-optical element itself has a high operational voltage.

Consequently, to apply a high voltage to the electro-optical material, it is necessary to reduce a thickness of each of the clad layers. For example, if each of the clad layers is thinned to be about 0.2 micrometers, a voltage applied to the electro-optical material is about 0.8 times as much as a voltage applied to the electro-optical element. This is practical if it is considered that an operational voltage is reduced. In this way, in a conventional optical waveguide type-electro-optical element, it is effective for a low voltage driving to thin the clad layers if possible (for reference, see Japanese Patent Application Publication No. 2009-080378 which is referred hereinafter to as Patent Document 1).

In the Patent Document 1, there is disclosed a structure in which an electro-optical element includes a core layer made of strong dielectric material and having a substrate of silicon, and clad layers comprising thin films each having a high dielectric permittivity in order to inhibit voltage drop in the clad layers, and a method for manufacturing the clad layers.

In the technology disclosed in the Patent Document 1, because each of the clad layers has a thin thickness, when a high electric field is applied to the electro-optical element, there is a problem that insulation breakdown occurs in the clad layers. In other words, when the electro-optical element is operated by applying a voltage of a high-intensity electric field to the electro-optical element, there is a problem that insulation breakdown occurs. If a voltage is applied to the electro-optical element, an electric field intensity applied to the clad layers is given by the following equation (3).

$$E_{cl}=\in_{co}/\in_{cl}\cdot E_{co} \qquad (3)$$

Where $E_{cl}$ is an electric field-intensity applied to each of the clad layers, and $E_{co}$ is an electric field-intensity applied to the core layer.

In an electro-optical element in which if the core layer is formed by a thin film made of lithium niobate which is one of an electro-optical material, and each of the clad layers is made of $SiO_2$, for example, $\in_{co}/E_{cl\ is}$ is about 7, an electric field which is 7 times higher than the electric field of the electro-optical element is applied to the clad layers. As an example, in an electro-optical element in which the core layer is formed by a thin film having 10 micrometers in thickness made of lithium niobate, and the voltage of 100V is applied to the electro-optical element, an electric field intensity applied to the core layer is 10 kV/mm, and the high electric field, 70 kV/mm is applied to the clad layers.

Because a voltage of insulation breakdown in a general silica glass is about 40 kV/mm, there is high possibility that insulation breakdown occurs in the clad layers. If the insulation breakdown occurs in the clad layers, the electro-optical element is subject to adverse effects as mentioned hereinafter.

First, it is considered that the insulation breakdown does not occur in the entire area of the clad layers simultaneously, but occurs locally in a partial area of the clad layers, for reasons of a thickness distribution of a film of each of the clad layers when the film is formed, a surface roughness of the film, adhesion between the film and the core layer, or the like.

In a place at which the insulation breakdown occurs, because each of the clad layers which are essential insulators functions as a conductor, if a small insulation breakdown occurs in the clad layers, it is considered that the same operation as a case where one or more small protrusions are provided on electrodes are performed in the place of the insulation breakdown.

It is known that an electric field is concentrated on the small protrusions. Therefore, there is possibility that insulation breakdown occurs in the core layer made of an electro-optical material. Even if insulation breakdown does not occur in the core layer, a conductive area is formed in the clad layers, and thereby there is possibility that charges from electrodes are injected in the core layer through the conductive area.

Even in cases where insulation breakdown occurs locally in the core layer of the electro-optical material and charges are injected in the core layer through the clad layers, the charges are unevenly injected in the core layer of the electro-optical material. When the charge injection occurs, an electric field formed in the core layer is broken by the charge injection. Consequently, when the electro-optical element is operated, inhomogeneous electric field intensity is formed in the core layer by the local charge injection.

When the electro-optical element is operated, it is important that an electric field is evenly formed in the core layer. In particular, if electric field within the optical waveguide is inhomogeneous, an amount of change of refractive index caused by the electric field is different every areas of the optical waveguide. Consequently, a shape of light beam propagated in the optical waveguide is significantly deformed.

In particular, in a case of a slab optical waveguide where an optical waveguide has no structure confining charges laterally, deformation of a beam shape by the inhomogeneous electric field is significantly appeared. The deformation of the beam shape results in reduction of extinction ratio, if the electro-optical element is used as a modulator, and in deterioration of a shape of emitted light beam and reduction of image dissection score which can be resolved by a scanner for light beam, if the electro-optical element is used as the scanner.

In this way, there is a problem in the conventional clad layers that a beam shape of light beam passing through the optical waveguide is deformed, and hence performance of the electro-optical element is degraded

DISCLOSURE OF INVENTION

An object of the present invention is to provide an electro-optical element capable of inhibiting charge injection into an electro-optical material of a core layer in the electro-optical element and preventing a beam shape of light beam transmitting in the electro-optical element from being distorted.

To accomplish the above object, an electro-optical element according to an embodiment of the present invention includes a core layer made of an electro-optical material, a clad structure disposed on each of opposite sides of the core layer and configured to form an optical waveguide together with the core layer, and a pair of electrode layers, one of which being disposed on one side of the clad structure and another being disposed on another side of the clad structure.

The clad structure includes a first clad layer and a second layer. The second clad layer has a dielectric permittivity larger than that of the first clad layer, and the second clad layer has a thickness thicker than that of the first clad layer.

DESCRIPTION OF EMBODIMENTS

Preferred embodiments of the present invention will be explained hereinafter in detail with reference with the accompanying drawings.

First Embodiment

Figure 1:
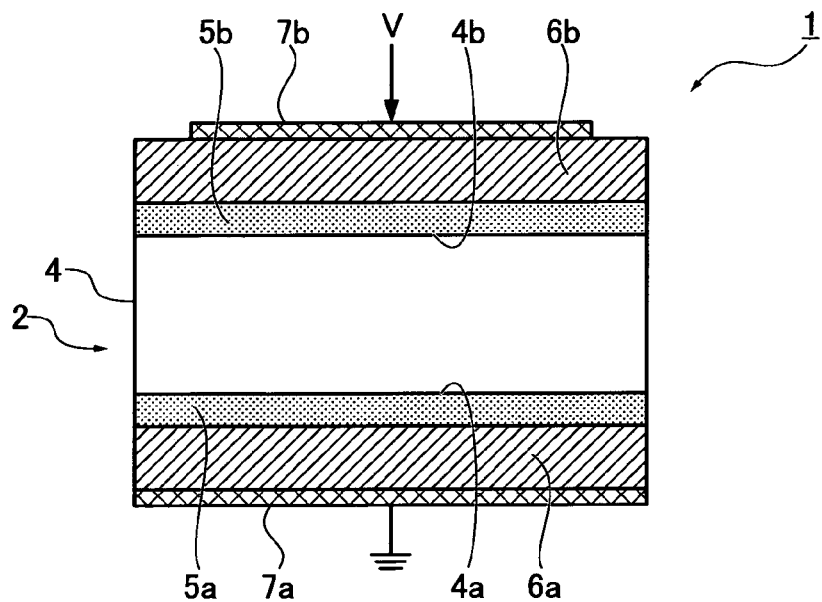
FIG. 1 is a sectional view showing an electro-optical element according to a first embodiment of the present invention.

FIG. 1 illustrates an electro-optical element according to a first embodiment of the present invention.

The electro-optical element 1 as shown in FIG. 1 includes an optical waveguide 2. The optical waveguide 2 includes a core layer 4 made of an electro-optical crystal as an electro-optical material. A clad structure is disposed on each of opposite sides of the core layer 4. One clad structure disposed on one side of the core layer 4 includes a first clad layer 5a provided on one side, for example, a lower surface 4a of the core layer 4, and a second clad layer 6a provided on a lower surface of the first clad layer 5a. On the other hand, another clad structure disposed on another side of the core layer 4 includes a first clad layer 5b provided on another side, that is to say, an upper surface 4b of the core layer 4 and a second clad layer 6b provided on an upper surface of the first clad layer 5b.

The optical waveguide 2 is formed by the core layer 4 constituting a core of the electro-optical element 1, the first clad layers 5a and 5b provided on the both sides of the core layer 4, respectively and the second clad layers 6a and 6b provided on the first clad layers 5a and 5b, respectively. After the first clad layers 5a and 5b are provided on the core layer 4, the second clad layers 6a and 6b are provided on the first clad layers 5a and 5b.

A pair of first electrode layers 7a and 7b are provided. More specifically, for example, the first electrode layer (lower electrode layer) 7a is provided on the lower surface of the second clad layer 6a, and the first electrode layer (upper electrode layer) 7b is provided on the upper surface of the second clad layer 6b. Consequently, the core layer 4 is disposed between the pair of opposite first electrode layers 7a and 7b through the first clad layers 5a, 5b and the second clad layers 6a, 6b.

The first clad layers 5a and 5b, the second clad layers 6a and 6b, and the first electrode layers 7a and 7b are sequentially provided on the core layer 4.

The provision of the first clad layers 5a and 5b, the second clad layers 6a and 6b, and the first electrode layers 7a and 7b can be performed through any process, such as printing, vapor deposition or the like.

In the electro-optical element structured as mentioned above, when a voltage V is applied to the first electrode layers 7a and 7b, a refractive index of the core layer 4 is changed.

The core layer 4 has, for example, several hundred nanometers to several ten micrometers in thickness. The reason that the first and second clad layers 5a (5b) and the second clad layers 6a (6b) are sequentially provided on surfaces of the core layer 4 is to transfer guided light by closing it into the core layer 4 effectively.

The first clad layers 5a, 5b and the second clad layers 6a, 6b are dielectric bodies which respectively have a different dielectric permittivity with respect to each other. For example, the dielectric permittivity of the second clad layers 6a (6b) is larger than that of the first clad layers 5a (5b). In addition, each of at least the first clad layers 5a (5b) is set to have a refractive index lower than that of the core layer 4. Furthermore, each of the second clad layers 6a (6b) is set to have a thickness thicker than that of each of the first clad layers 5a (5b).

It is preferable to use a non-linear optical crystal such as lithium niobate ($LiNbO_3$), lithium tantalite ($LiTaO_3$), KTP ($KTiOPO_4$), SBN, and KTN for an electro-optical material making the core layer 4.

After these optical crystals are adhered to a supporting substrate (not shown), when they are polished, it is possible to acquire a thinned electro-optical element, while maintaining a characteristic of the optical crystals. On the other hand, for a material making the clad layers 5a, 5b and 6a, 6b, it is possible to use a dielectric material such as silicon dioxide ($SiO_2$), tantalum oxide ($Ta_2O_5$), titanium oxide ($TiO_2$), silicon nitride ($Si_3N_4$), aluminum oxide ($Al_2O_3$), hafnium oxide ($HfO_2$) or the like, or a mixing material of the dielectric material and glass. It is preferable to use a metallic material such as Au, Pt, Ti, Al, Ni, Cr or the like, or a transparent material such as ITO (indium tin oxide) or the like.

Here, reference is made to a case applying a voltage to an optical waveguide in which one clad layer is provided on a core layer made of an electro-optical crystal as a general optical waveguide structure.

Figure 5:
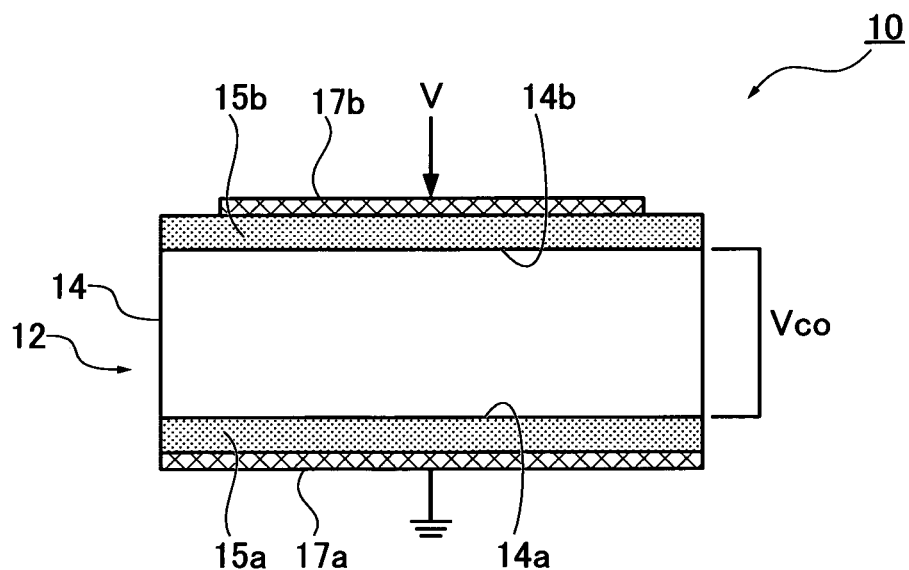
FIG. 5 is a sectional view showing a conventional electro-optical element.

FIG. 5 illustrates an example of the general optical waveguide structure. In FIG. 5, reference numeral 10 shows an electro-optical element. The electro-optical element 10 includes an optical waveguide 12. The optical waveguide 12 has a core layer 14 made of an electro-optical crystal as an electro-optical material. A clad layer 15a is provided on a lower surface 14a of the core layer 4, and an electrode layer 17a is provided on a lower surface of the clad layer 15a. A clad layer 15b is provided on an upper surface 14b of the core layer 4, and an electrode layer 17b is provided on an upper surface of the clad layer 15b.

To confine guided light in the optical waveguide 12 effectively, it is preferable to use a material having a refractive index as small as possible for a material making the clad layer 15a. However, a material making the clad layer 15a has usually a small dielectric permittivity. Because the electro-optical crystal has usually a large dielectric permittivity, a ratio $\epsilon_{co}/\epsilon_{cl}$ of a dielectric permittivity $\epsilon_{co}$ of the core layer 14 to a dielectric permittivity $\epsilon_{cl}$ of the clad layer 15a becomes a large value.

Consequently, when a voltage is applied to the electro-optical element 10, in order to inhibit a voltage drop at the clad layer 15a and approach an applied voltage $V_{co}$ to the core layer 14 to an applied voltage V to the optical waveguide 12, a ratio $d_{cl}/d_{co}$ of a thickness $d_{cl}$ of the clad layer 15a to a thickness $d_{co}$ of the core layer 14 may be set to be small as is clear from the aforementioned equation (2). In other words, it is requested that the thickness of the clad layer 15a is thinner than that of the core layer 14.

In a case of the optical waveguide type-electro-optical element 10 in which, for example, the core layer 14 is formed by a thin film made of lithium niobate and the clad layer 15a is made of SiO2, if the clad layer 15a is thinned to 0.2 micrometers in thickness, an applied voltage $V_{co}$ to the core layer 14 formed the thin film made of lithium niobate is inhibited to a value of a degree of 0.8 times as much as an applied voltage V to the electro-optical element 10.

However, when the clad layers 15a and 15b are extremely thinned, the application of the voltage V makes it possible to inject charges from the electrode layers 17a and 17b through the clad layers 15a and 15b into the electro-optical crystal or core layer 14. If the charges are injected in the electro-optical crystal, there is a problem that turbulent distribution occurs in an electric field formed in the electro-optical crystal, and therefore distortion occurs in a shape of light beam transmitting in the optical waveguide 12. Accordingly, it is requested to inhibit the charge injection into the electro-optical crystal when applying a voltage to electro-optical element 10.

To satisfy the request, the first embodiment according to the present invention has a structure configured to include the first clad layers 5a and 5b and the second clad layers 6a and 6b, use a material having a high dielectric permittivity for the second clad layers 6a and 6b, and dispose the second clad layers 6a and 6b outside the first clad layers 5a and 5b having a low refractive index. Because the second clad layers 6a and 6b have a high dielectric permittivity, even if a thickness $d_{cl}$ thereof is thickened, a voltage drop at the second clad layers 6a and 6b is small. In addition, because the second clad layers have a thick thickness, it can be inhibited that charges from the first electrode layers 7a and 7b at the time of applying a voltage to the electro-optical element are injected into the core layer 14.

In a case of the optical waveguide type-electro-optical element 1 in which, for example, the core layer 4 is formed by a thin film made of lithium niobate and the second layers 6a and 6b are made of $Ta_2O_5$, because lithium niobate and $Ta_2O_5$ have a similar dielectric permittivity, even if a thickness d1 of each of the second clad layers 6a and 6b made of $Ta_2O_5$ is thickened to be about 1 micrometer, an applied voltage $V_{co}$ to the core layer made of lithium niobate can be inhibited to a degree of 0.8 times as much as a voltage V applied to the electro-optical element 1.

In addition, because each of the second clad layers 6a and 6b has a thick film thickness $d_{cl}$, the second clad layers can block charges from the first electrode layers 7a and 7b, consequently, it is possible to inhibit injection of the charges into the core layer 4 when applying a high voltage to the electro-optical element 1.

In an electro-optical element 1 including a core layer 4 made of lithium niobate having a thickness, about 10 micrometers and second clad layers 6a and 6b made of $Ta_2O_5$ having a thickness, 1 micrometer, when a voltage V=100V is applied to the electro-optical element 1, a current density flowing in the electro-optical element 1 was 2 nA/mm² or less.

It is evidenced that the electro-optical element 1 has a current density of 1/10 or less of an electro-optical element 1' including a clad layer 5a' made of SiO2 having a thickness, about 0.2 micrometers. It is confirmed that the electro-optical element according to the present invention has advantageous effect of the inhabitation of charge injection. In this case, it is possible to reduce very a thickness $d_{cl}$ of each of the first clad layers 5a and 5b made of a material having a low refractive index. The thickness $d_{cl}$ required to each of the first clad layers 5a and 5b depends on a refractive index and a thickness of the core layer 4 in the optical waveguide 2 constituting the electro-optical element 1.

For example, when assuming that the core layer 4 is made of lithium niobate, the first clad layers 5a and 5b are made of $SiO_2$, and the core layer 4 has a thickness of 10 micrometers, the optical waveguide 2 becomes a multimode optical waveguide, but because a difference between refractive indexes of the core layer 4 and each of the first clad layers 5a and 5b is very large to be 0.7 or more, if the first clad layers 5a and 5b are formed to have about 0.2 micrometers in thickness, it is possible to confine approximately the entire light power in electro-optical crystal.

In addition, to inhibit propagation of high-order mode, it is effective to thin further the thickness of the first clad layers 5a and 5b. Light propagating the optical waveguide 2 appears significantly on the first clad layers 5a and 5b in case of a high-order, usually. Propagation light appeared outside the first clad layers 5a and 5b which have a very thin thickness reaches into an inside portion of each of the second clad layers 6a and 6b.

Here, because each of the second clad layers 6a and 6b has a refractive index larger than that of each of the first clad layers 5a and 5b, light component reached to the second clad layers 6a and 6b is propagated in the optical waveguide 2, remaining held in the second clad layers 6a and 6b. Because the first electrode layers 7a and 7b are directly in contact with the second clad layers 6a and 6b, the light component is absorbed in the first electrode layers 7a and 7b or dissipated in the optical waveguide 2 while repeating reflection with loss.

By using this advantageous effect, it is possible to inhibit the propagation of the high-order mode light in the optical waveguide 2. In a large number of optical waveguide type-electro-optical elements 1, if the propagation mode is different, because an amount of variation of the refractive index is different, in a case where the optical waveguide 2 is a multimode optical waveguide, it is preferable to inhibit the propagation of high-order mode light. That is to say, if a thickness of each of the first clad layers 5a and 5b is set to be smaller than a wavelength of light propagated in the electro-optical element 1, there is a advantageous effect that it is possible to inhibit the propagation of the high-order mode light.

In addition, generally, in the electro-optical waveguide structure as shown in FIG. 5, the refractive index of each of the clad layers 15a and 15b is smaller than that of the core layer 14. In contrast, in the first embodiment, it is possible to select a material of the first clad layers 6a and 6b as shown in FIG. 1 without depending on the refractive index of the material of the core layer 4. For example, a consideration is made with respect to a case where KTP (kalium litanyl phosphate) is selected for a material of the core layer 4.

The KTP has a refractive index of about 1.83 which is relatively low in electro-optical crystals. Therefore, generally, a dielectric material having a low refractive index as a material for clad layers is consequently selected. However, in the first embodiment, a material, for example, $Ta_2O_5$ having a refractive index larger than that of the core layer 4, for the second clad layers 6a and 6b may be selected.

In this case, for example, when a material having a low refractive index such as $SiO_2$ is used for each of the first clad layers 5a and 5b, it is possible to accomplish block of basic-mode light at a boundary of the first clad layers 5a, 5b and the core layer 4 and inhibit charge injection in the core layer by the second clad layers 6a and 6b. The second clad layers 6a and 6b each having a large refractive index are effective to inhibit propagation of high-order mode light in the optical waveguide 2.

In addition, each of the second clad layers 6a and 6b is not required to be formed by a transparent material. It is preferable that a material having a high dielectric permittivity is used for each of the second clad layers 6a and 6b. However, there may be included materials which are easy to absorb or scatter light in such materials.

According to the first embodiment, high dielectric material also can be used for the second clad layers 6a and 6b. More specifically, it is effective that a mixing material in which a ceramic material is dispersed in a resin material is applied on an outer side surface of each of the first clad layers 5a and 5b, or a ceramic material is applied on each of the outer side surfaces of the first clad layers through a film-formation process by aerosol deposition or the like, thereby second clad layers can be formed on the first clad layers.

Even in such an optical waveguide structure, it is possible to accomplish block of basic-mode light at a boundary of the first clad layers 5a, 5b and the core layer 4 and inhibit charge injection in the core layer 4 by the second clad layers 6a and 6b. In addition, because light is absorbed or scattered at the second clad layers 6a and 6b, it is possible to inhibit the propagation of high-order mode light in the optical waveguide 2.

Second Embodiment

Figure 2:
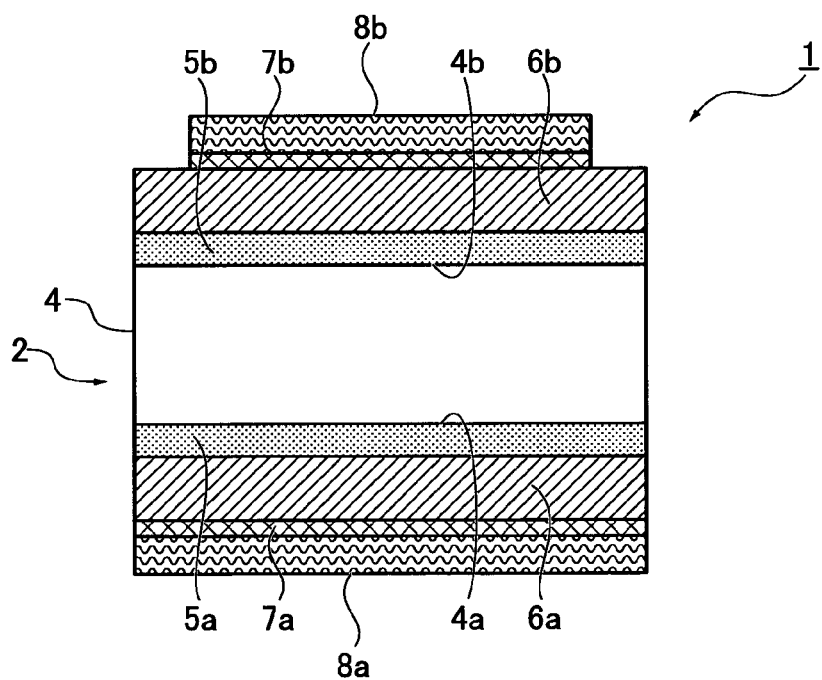
FIG. 2 is a sectional view showing an electro-optical element according to a second embodiment of the present invention.

FIG. 2 illustrates an electro-optical element according to a second embodiment of the present invention. In the electro-optical element shown in FIG. 2, identical reference numbers are attached to similar parts to that in the electro-optical element according to the first embodiment as shown in FIG. 1, and detailed descriptions thereof are omitted.

The electro-optical element according to the second embodiment includes an electrode layer structure which is disposed outside each of the second clad layers 6a and 6b. The electrode layer structure comprises two kinds or more of metallic thin films More specifically, the electrode layer structure disposed outside the second clad layer 6a includes a first electrode layer 7a provided on an outer surface of the second clad layer 6a and a second electrode layer 8a provided on an outer surface of the first electrode layer 7a, and the electrode layer structure disposed outside the second clad layer 6b includes a first electrode layer 7b provided on an outer surface of the second clad layer 6b and a second electrode layer 8b provided on an outer surface of the first electrode layer 7b.

In the second embodiment, each of the first electrode layers 7a, 7b and each of the second electrode layers 8a, 8b are made of different materials. It is advisable that each of the second electrode layers 8a and 8b forming uppermost surfaces of the electro-optical element 1 is made of a material which is difficult to be affected by change in surrounding environment, such as Au, Pt or the like.

If adhesion between each of the first electrode layers 7a, 7b and each of the second clad layers 6a, 6b is not good, the first electrode layers or the second clad layers are made of an electrical material having a good adhesion, or a sheet made of such an electric material is disposed between each of the first electrode layers 7a and 7b and each of the second clad layers 6a and 6b.

It is known that if different materials are used for the electrode layers, because work function thereof also is different, an amount of charge injection into the electro-optical element 1 is consequently different. Accordingly, it is preferable to select electric materials in which charge injection is difficult to occur, for the first electrode layers 7a and 7b.

More specifically, it is preferable that Cr, Ti, Al or the like having a small work function is used for a material of each of the first electrode layers 7a and 7b. Because these metals are easy to oxidize relatively, there is a problem that a composition of electrode materials changes during operation for a long time and an effective function as the electrode layers cannot be achieved. To resolve such a problem, it is effective that after the first electrode layers are formed, subsequently the second electrode layers 8a and 8b are formed on the first electrode layers 7a and 7b, respectively.

Third Embodiment

Figure 3A:
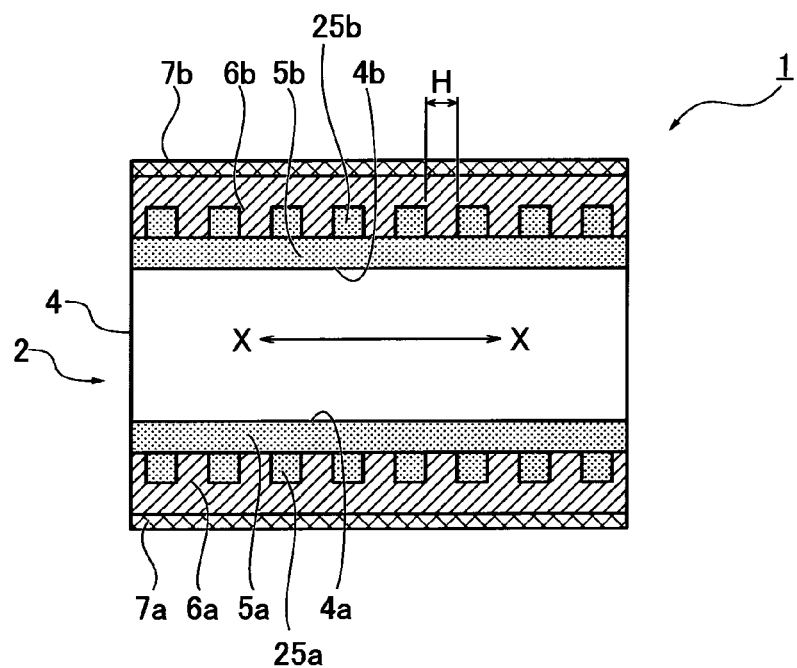
FIG. 3A is a sectional view showing an electro-optical element according to a third embodiment of the present invention.
Figure 3B:
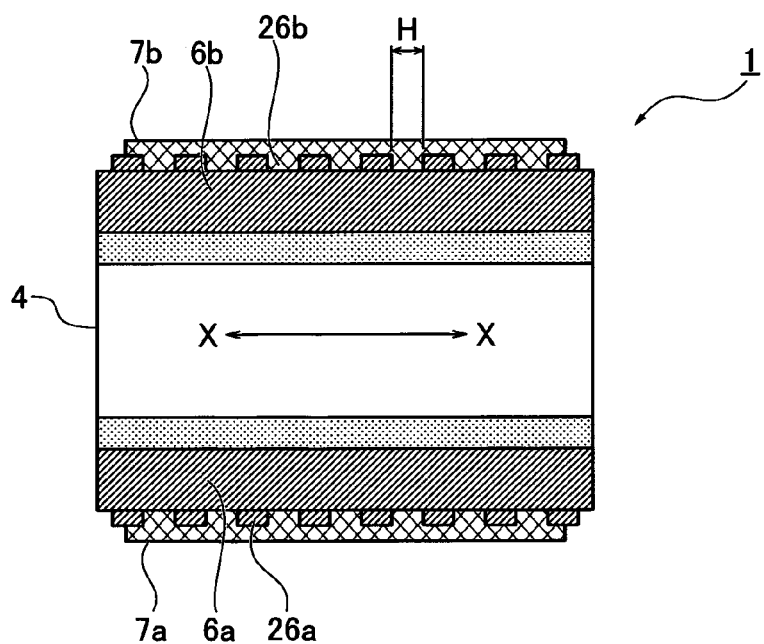
FIG. 3B is a sectional view showing an electro-optical element according to the third embodiment of the present invention.

FIGS. 3A and 3B illustrate an electro-optical element according to a third embodiment of the present invention.

FIG. 3A illustrates an example in which a plurality of fine structures 25a are provided at intervals on the first clad layer 5a, and a plurality of fine structures 25b are provided at intervals on the first clad layer 5b. The second clad layer 6a is formed on a surface of the first clad layer 5a to cover the fine structures 25a, and the second clad layer 6b is formed on a surface of the first clad layer 5b to cover the fine structures 25b. The first electrode layer 7a is formed on a surface of the second clad layer 6a, and the first electrode layer 7b is formed on a surface of the second clad layer 6b. In the illustrated embodiment, each of the fine structures comprises a fine concave and convex structure formed on a surface of each of the first clad layers.

The fine structures 25a and 25b are provided by forming fine apertures in the first clad layers using a dry etching technology after the first clad layers 5a and 5b are formed, for example. Alternatively, the fine structures 25a and 25b can easily be formed by increasing a surface roughness of each of the first clad layers 5a and 5b through polishing processing, wet etching or the like.

The concave and convex structures in the fine structures 25a and 25b are formed at equal intervals or random intervals in a direction of light-propagation (X-X direction as shown by arrow). It is preferably that an interval H between adjacent structures in each of the fine structures 25a and 25b is set to be the same as or lesser than a wavelength of light propagating in the optical waveguide 2. The inhibiting effect of the charge injection by the clad layers having the multi-structure is the same as in the first and second embodiments.

In the third embodiment, by providing the fine structures 25a and 25b in the first clad layers 5a and 5b, the inhibition of the charge injection and the light confinement into the core layer 4 can be further effectively achieved.

For example, in the optical waveguide structure as shown in FIG. 3A, when the first clad layers 5a and 5b are significantly thinned, it is possible to set an equivalent refractive index of the first clad layers acquired by light propagating in the optical waveguide 4 to be an intermediate value of a refractive index of each of the first and second clad layers.

The equivalent refractive index of the first clad layers can be adjusted to any value by changing the number (density) of concave and convex portions per unit area of each of the fine structures 25a and 25b. Thereby, it is possible to inhibit the charge injection into the core layer 4 based on the second clad layers 6a and 6b and set the refractive index of the clad layers optionally. This makes it possible to accomplish easy design of the optical waveguide 2.

FIG. 3B illustrates an example in which a plurality of fine structures 26a are provided at intervals on the second clad layer 6a, and a plurality of fine structures 26b are provided at intervals on the second clad layer 6b. The first electrode layer 7a is formed on a surface of the second clad layer 6a to cover the fine structures 26a, and the first electrode layer 7b is formed on a surface of the second clad layer 6b to cover the fine structures 26b. A method of forming the fine structures 26a and 26b is the same as the aforementioned method for forming the fine structures 25a and 25b.

The fine structures 26a and 26b are formed at equal intervals or random intervals in a direction of light-propagation (X-X direction as shown by arrow). It is preferably that an interval H between adjacent structures in each of the fine structures 26a and 26b is set to be the same as or lesser than a wavelength of light propagating in the optical waveguide 2. It is preferably that an interval H between adjacent structures in each of the fine structures 26a and 26b is set to be the same as or lesser than a wavelength of light propagating in the optical waveguide 2.

In the optical waveguide structure as shown in FIG. 3B, it is possible to control an amount of charges which are emitted from the first electrode layers 7a and 7b and injected in the second clad layers 6a and 6b, by providing the fine structures 26a and 26b on the second clad layers 6a and 6b, differently from the optical waveguide structure as shown in FIG. 3A.

Because charges are evenly injected in the second clad layers 6a and 6b by the fine structures 26a and 26b, it is possible to prevent collecting of electric field from occurring at the first clad layers 5a and 5b, and inhibit the generation of insulation breakdown of the second clad layers 6a and 6b.

Fourth Embodiment

Figure 4:
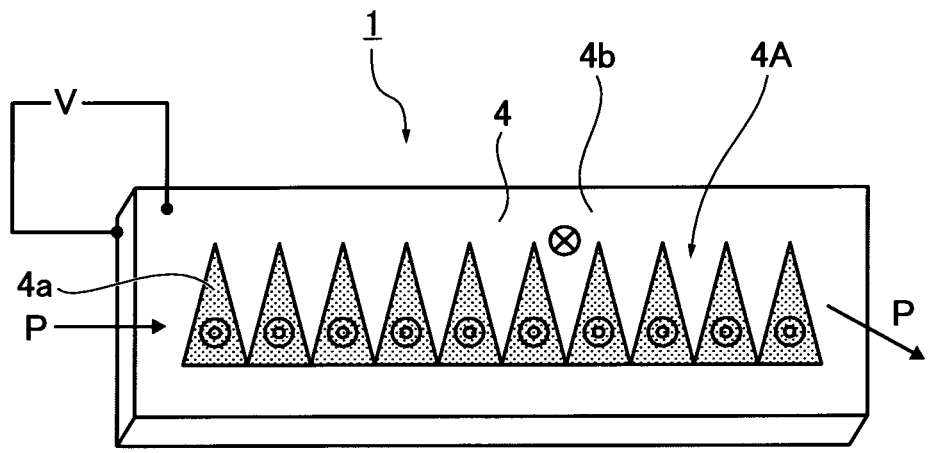
FIG. 4 is a sectional view showing an electro-optical element according to a fourth embodiment of the present invention.

FIG. 4 illustrates an electro-optical element according to a fourth embodiment of the present invention.

In the fourth embodiment, an example in which the electro-optical element 1 is applied to a polariscope is shown.

It is necessary to form a prism structure 4A in an electro-optical material constituting the core layer 4 in order to use the electro-optical element 1 as the polariscope. Concretely, lithium niobate crystal, lithium tantalite crystal or the like is used for the electro-optical material.

The core layer 4 includes a plurality of polarization-inverted areas 4a each having a triangular shape (prism shape), and a residual area 4b. Each of the polarization-inverted areas 4a has crystal axes which reverse in direction to crystal axes of the residual area 4b.

The polarization-inverted areas 4a are arranged in a regular manner in a direction of propagation of light beam (waveguide light) P. The direction of the crystal axes of each of the polarization-inverted areas 4a is, for example, directed (shown by arrow) from a back surface of a paper to a front surface of the paper, as shown in FIG. 4, and the direction of the crystal axes of the residual area 4b is directed from the front surface of the paper to the back surface of the paper.

When a voltage is applied to the core layer 4, each of the polarization-inverted areas 4a is opposite in sign of variation in refractive index to the residual area 4b. Therefore, the prism structure 4A occurs in the core layer 4. The prism structure 4A comprises an assembly of a plurality of prisms. A propagation angle of the light beam P (waveguide light) propagating in the core layer 4 is bent at a boundary of each prism, and a moving direction of the light beam P in the core layer differs or is deflected from an incident direction when entering the electro-optical element 1. In other words, the light beam P is emitted from the electro-optical element 1 in a direction different from the incident direction. It is possible to change a beam deflection angle of the light beam depending on a magnification of an applied voltage V to the electro-optical element. Thereby, the electro-optical element 1 can be used as a polariscope.

There are known various methods to form the aforementioned polarization-inverted areas 4a in an electro-optical crystal. In general, a high voltage corresponding to a high electric field of an anti-electric field or more may be applied to a crystal material of the electro-optical crystal. It is possible to form triangle-like (prism shaped) polarization-inverted areas 4a by applying a high voltage to the electro-optical element 1 in a manner that a portion wanting to form the triangle-like (prism shaped) polarization-inverted areas 4a is masked by an insulation member. In this case, the polarization-inverted areas 4a can sufficiently be formed even if a usual photoresist is used as the insulation member.

In a prism type-polariscope, because a deflection angle becomes large as an applied voltage becomes high, there is possibility that the voltage of 100V or more is applied to the electro-optical element 1. If the core layer 4 has a thickness of micrometer order, a very large electric field may be applied to the electro-optical crystal, the first clad layers 5a and 5b, and the second clad layers 6a and 6b.

Accordingly, charge injection from the first electrode layers 7a and 7b to the core layer 4 occurs, and hence there is possibility that an electro-optical characteristic and a performance of the electro-optical element 1 are deteriorated. However, as described in the aforementioned embodiments, because the multi-clad layers are provided in the electro-optical element, it is possible to inhibit the charge injection from the electrode layers to the core layer even if a high voltage is applied to the electro-optical element 1.

As mentioned above, in the electro-optical element according to the present invention, the clad layers are formed in the multi-layer structure including thin films or clad layers each having a low dielectric permittivity and thick films or clad layers each having a high dielectric permittivity, which are sequentially disposed in each of opposite sides of a core layer constituting an optical waveguide. In the electro-optical element as mentioned above, the clad layers each having a high dielectric permittivity are configured to inhibit charge injection from electrode layers into the core layer when the electro-optical element is operated, and the clad layers each having a low dielectric permittivity are configured to achieve confinement or block of light to the core layer.

Consequently, in the optical waveguide type-electro-optical element, it is possible to inhibit injection of charges in an electro-optical material of the core layer, and therefore to prevent a shape of light beam from being deformed, when driving the electro-optical element.

In addition, when waveguide light is propagated in the electro-optical element, it is possible to inhibit propagation of high-order mode-waveguide light in the electro-optical element.

Although the preferred embodiments of the present invention have been described, the present invention is not limited to these embodiments. It should be appreciated that changes and modifications can be made to the embodiments.

INDUSTRIAL APPLICABILITY

Although the present invention has been applied to an electro-optical element, the present invention can be applied to various communication or optical devices, or parts used in the communication or optical devices.

CROSS-REFERENCE TO THE RELATED APPLICATION

The present application is based on and claims priority from Japanese Application No. 2009-195426, filed on Aug. 26, 2009, the disclosure of which is hereby incorporated by reference herein in its entirety.

The invention claimed is:

1. An electro-optical element, comprising:
a core layer made of an electro-optical material;
a first clad structure directly on one side of the core layer and configured to form an optical waveguide together with the core layer; and
a second clad structure directly on an opposite side of the core layer and configured to form an optical waveguide together with the core layer;
wherein
(1) the first clad structure comprises a first clad layer and a second clad layer, wherein the first clad layer is directly on the core layer and the second clad layer is directly on the first clad layer, wherein the second clad layer has an dielectric permittivity larger than that of the first clad layer, and wherein the second clad layer has a thickness thicker than that of the first clad layer, and
(2) the second clad structure comprises a first clad layer and a second clad layer, wherein the first clad layer is directly on the core layer and the second clad layer is directly on the first clad layer, wherein the second clad layer has an dielectric permittivity larger than that of the first clad layer, and wherein the second clad layer has a thickness thicker than that of the first clad layer,
a first electrode on the first clad structure, where on the first electrode is on the second clad layer of the first clad structure; and
a second electrode on the second clad structure, where the second electrode is on the second clad layer of the second clad structure.

2. The electro-optical element according to claim 1, wherein the first clad layers have a thickness smaller than a wavelength of light propagated in the core layer.

3. The electro-optical element according to claim 1, wherein the second clad layers have a refractive index larger than that of the core layer.

4. The electro-optical element according to claim 3, wherein the second clad layers have an optical transmittance lower than that of the first clad layer.

5. The electro-optical element according to claim 1, wherein each of the electrodes comprise at least two kinds of metallic thin films.

6. The electro-optical element according to claim 1, wherein at least one of the first clad layers and the second clad layers comprises a fine structure.

7. The electro-optical element according to claim 1, wherein the core layer comprises a polarization-inverted area.

8. The electro-optical element according to claim 1, wherein the electro-optical material of the core layer comprises one or more of lithium niobate, lithium tantalate, kalium niobate, barium titanate, KTN, STO, BTO, SBN, PLZT, PZT, and DAST.

9. The electro-optical element according to claim 1, wherein the second clad layers are made of a materials comprising at least one of tantalum oxide, aluminum oxide, hafnium oxide, lithium niobate, lithium tantalate, kalium niobate, barium titanate, KTN, STO, BTO, SBN, PLZT, PZT, and DAST.

10. The electro-optical element according to claim 1, wherein when an electric field of 10 kV/mm is applied to the core layer, a current density flowing in the core layer is set to be 2 $nA/mm^2$ or less.

11. The electro-optical element according to claim 1, wherein the thickness of the first clad layers is less than 20% of the thickness of the core layer.

12. The electro-optical element according to claim 1, wherein the second clad layers comprise a material having a refractive index larger than the refractive index of the core layer.

13. The electro-optical element according to claim 1, wherein a ceramic material is attached to the second clad layers.

14. The electro-optical element according to claim 13, wherein a mixing material in which the ceramic material is dispersed in a resin material is applied to the second clad layer.

15. The electro-optical element according to claim 14, wherein the ceramic material is deposited on the outer side of the first clad layer.

* * * * *